United States Patent
Braun

[15] 3,680,243
[45] Aug. 1, 1972

[54] TRANQUILIZING DART FOR MARINE USE

[72] Inventor: Frank R. Braun, 1290 Rowland Ave., Camarillo, Calif. 93010

[22] Filed: Nov. 18, 1970

[21] Appl. No.: 90,554

[52] U.S. Cl. ............................................... 43/6
[51] Int. Cl. .................................... A01k 81/04
[58] Field of Search ............... 43/6, 4, 4.5, 17, 19; 273/106.5

[56] References Cited

UNITED STATES PATENTS 3,532,375  10/1970  Heartness ........................ 43/6
2,995,373   8/1961  Cox ................................. 43/6
2,547,308   4/1951  Dean .............................. 43/17
3,210,880  10/1965  Grenier ........................... 43/6

Primary Examiner—Warner H. Camp
Attorney—Richard S. Sciascia, Q. Baxter Warner and Howard J. Murray, Jr.

[57] ABSTRACT

A hypodermic dart designed to inject a tranquilizing substance into whales or other marine animals to be captured. The dart is combined with a device for marking the location of the animal innoculated in this manner so that it may readily be identified and followed visually and/or by radar until such time as the drug has taken effect and the creature is immobilized.

7 Claims, 6 Drawing Figures

PATENTED AUG 1 1972 3,680,243

Frank R. Braun
INVENTOR

By Howard J. Murray, Jr.
Agent

Q. Baxter Warner
Attorney

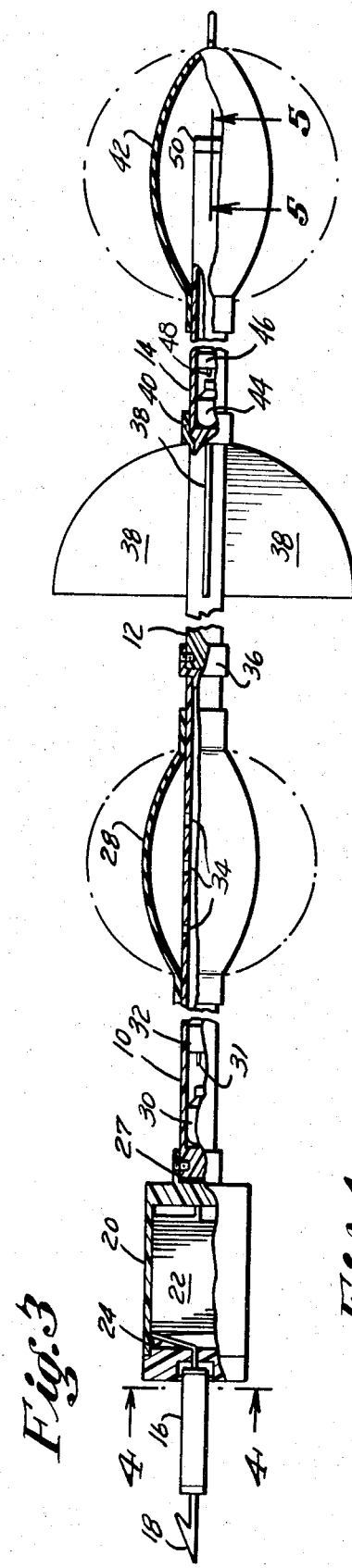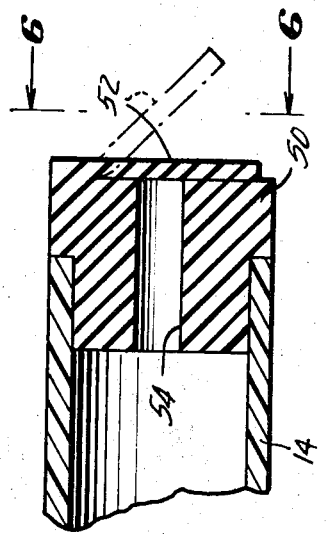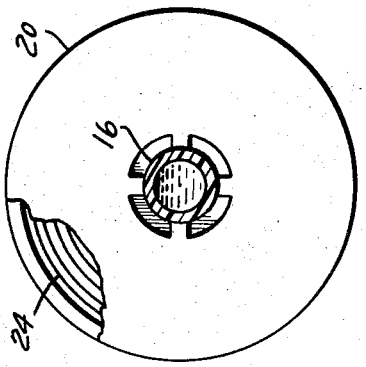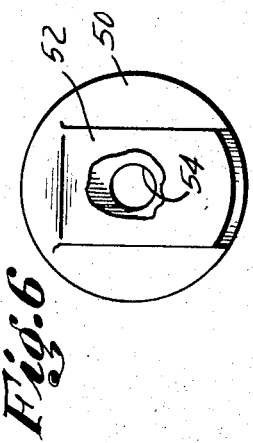
Frank R. Braun
INVENTOR

TRANQUILIZING DART FOR MARINE USE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many arrangements are known for throwing or shooting impact-actuated hypodermic syringes into animals or birds. However, in many cases these animals are able to travel considerable distances after being so innoculated, often making their identification difficult and allowing them to avoid capture.

In the case of marine creatures such as whales, they frequently sound under such circumstances, and inasmuch as it normally requires as long as 40 minutes for the medicine to take effect, visual surveillance during this entire period is most unlikely. Consequently, the risk of failure when using present methods is quite high.

SUMMARY OF THE INVENTION

The hypodermic dart herein disclosed is made up of a tubular shaft carrying an impact-actuated innoculating syringe on its front end. On impact with a marine creature, a pair of buoyant members inflate and lift the main body of the dart to the surface, the embedded syringe being connected thereto by a line which unreels as the target animal moves. At the rear end of the dart is a radar-reflecting device held clear of the water by one of the buoyant members.

STATEMENT OF THE OBJECTS OF THE INVENTION

One object of the present invention, therefore, is to provide a hypodermic dart especially designed for use in capturing marine animals.

Another object of the invention is to provide an impact-actuated syringe designed to unreel from a shaft following impact with a target animal.

A further object of the invention is to combine the above structure with means for visually and/or electronically locating the assembly and hence the animal into which the syringe has been injected.

Other objects, advantages and novel features of the invention will become apparent from the following detailed description of the invention when considered in conjunction with the accompanying drawings.

BRIEF DESCRIPTION OF THE DRAWINGS

FIG. 3 is a partly cross-sectional view of the dart of FIG. 1;

FIGS. 4 and 5 are sectional views slightly enlarged of the dart of FIG. 3 taken along the lines 4—4 and 5—5, respectively; and FIG. 6 is an end view of FIG. 5 taken along the line 6—6.

DESCRIPTION OF THE PREFERRED EMBODIMENT

Figure 1:
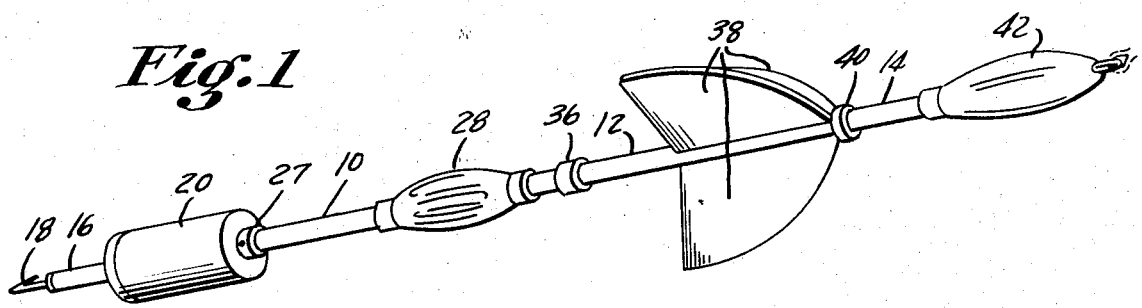
FIG. 1 is a perspective view of a preferred form of tranquilizing dart designed in accordance with the principles of the present invention.

The purpose of the present invention is to provide means for injecting a tranquilizer or other drug from a distance into a marine animal, and, at the same time, affix a marker thereto so that the animal's movements may be followed until such time as the drug has taken effect to immobilize the creature. It is designed especially for use in the capture of whales and porpoises.

The preferred embodiment of applicant's dart illustrated in the drawings includes several pieces 10, 12 and 14 of fiberglass tubing connected end-to-end as shown. Their overall length may, for example, be about 4½ feet. A hypodermic syringe 16 having a barbed needle 18 is located at one end of the dart, the syringe 16 containing the tranquilizer or other drug to be injected. Hypodermic syringes of this nature are well known, and incorporate means for forcefully extruding the drug through the needle into the target animal.

Syringe 16 is detachably supported on a container 20, the latter housing a reel 22 on which is wound a line or cable 24 one end of which is secured to syringe 16, as shown in FIG. 3 of the drawings. Line 24 may have a length of approximately 2,500 feet, and is designed to unwind from reel 22 following impact of the dart with a target animal, such as the one designated by the reference numeral 26 in FIG. 2. Container 20 is separably attached to tubular section 10 by a coupling member 27.

Figure 2:
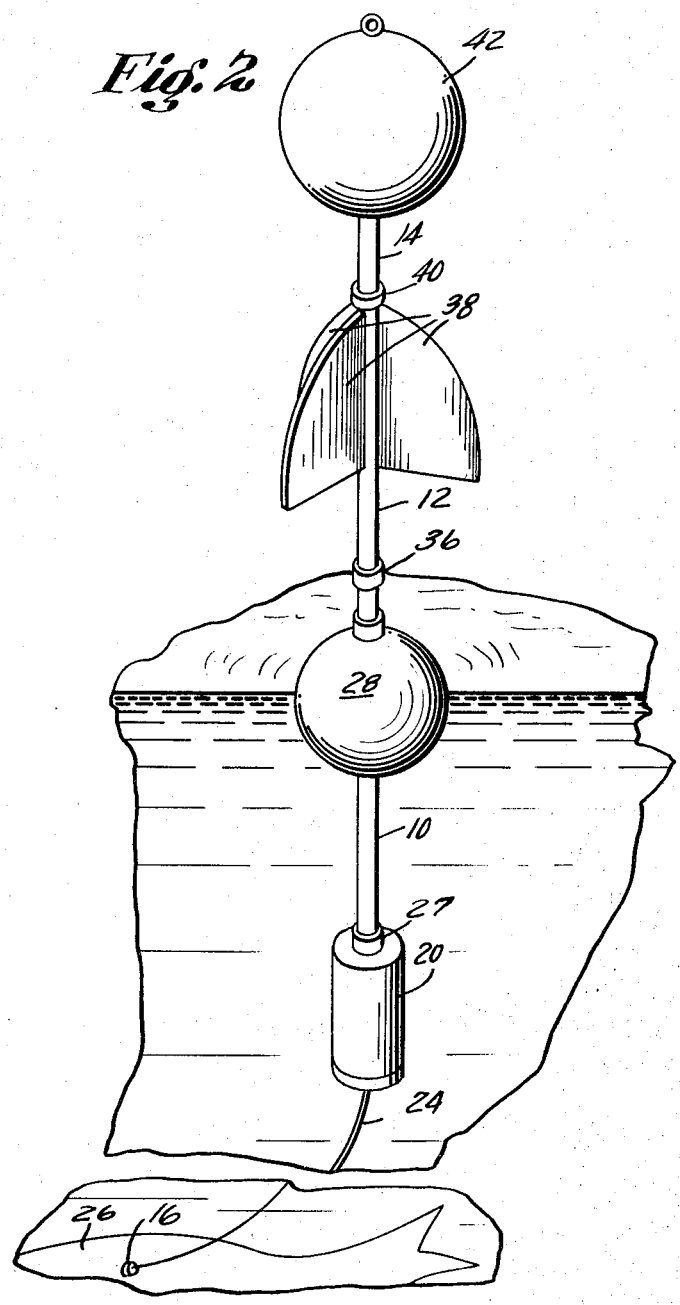
FIG. 2 is a view of the dart of FIG. 1 after use and in a position where it is floating on a body of water.

An inflatable bag 28 is carried on the tubing section 10. This bag 28 is shown in its collapsed condition in FIG. 1, and in its inflated condition in FIG. 2. The means for inflating the bag 28 may comprise a cartridge 30 of compressed gas (such as $CO_2$) frictionally restrained in the position within tubular member 10 shown in FIG. 3 of the drawings. The neck portion of cartridge 30 lies in the path of a pointed firing pin 31 carried by a firing pin block 32 which is free to slide within the hollow tubular member 10. Upon impact of the dart with a target animal, block 32 slides forwardly, the pin 31 piercing the neck of the cartridge 30 and allowing the compressed gas to pass around the block 32 and to enter the bag 28 through openings 34 in tubular member 10. The bag 28 then expands to the shape shown in FIG. 2 and by the broken line in FIG. 3. The function of this gas-filled bag is to provide a buoyant flotation member which maintains the dart in a vertical position in the water, as shown in FIG. 2, after the line 24 has unreeled.

A second detachable coupling member 36 interconnects the tubular sections 10 and 12. Carried on the latter are a plurality of radially extending vanes 38. These vanes 38 act to orient the dart in its passage through the air after being thrown or launched toward a target animal, and, since they are in a position above the inflated bag 28 when the dart is floating on the water (FIG. 2), they also serve as a radar reflector to assist in location of the dart by means of conventional radar equipment. If the vanes 38 are four in number, they constitute a well-known "corner reflector."

A sill further detachable coupling 40 interconnects the tubular sections 12 and 14. The latter carries thereon a second inflatable bag 42 which may be similar to bag 28 described above. A second cartridge 44 of compressed gas is frictionally restrained in position within tubular member 14 in the same manner that cartridge 30 is restrained within section 10. A second firing pin block 46 having a firing pin 48 is free to slide within tubular member 14, and, upon impact of the dart with a target animal, pin 48 pierces the neck of cartridge 44 to release gas which flows through a one-way valve 50 (see FIG. 5) at the end of tubular member 14 to fill the bag 42. The resulting configuration of both bags 28 and 42 as shown in FIG. 2.

Valve 50 (FIGS. 5 and 6) is designed to prevent leakage of air from bag 42 after it has been filled with gas. It may comprise a flap 52 which flexes forwardly to the position shown by the broken lines in FIG. 5 when gas from cartridge 44 is flowing through conduit 54 to fill the bag 42. However, after this flow of gas ceases, flap 52 returns to its normal position as illustrated by the solid lines to prevent return of gas from bag 42 through the conduit 54.

The function of bag 42 (which may be brightly colored) is to facilitate visual tracking of the device when it is floating in the water after having been carried for some distance by the animal 26 before the injected drug has taken effect. The long line 24 permits the animal (such as a whale, porpoise, shark, etc.) to deeply "sound" without severing connection with the floating assembly of FIG. 2.

Since the couplings 27, 36 and 40 are detachable, various combinations of the sectional units may be chosen in accordance with the particular conditions under which the invention device is to be employed. Complete freedom of functional interchange is thus made available. This sectional design also allows the dart to be disassembled for transportation and compact storage when not in use.

Since the bags 28 and 42 inflate essentially simultaneously, the bag 42, being buoyant after inflation, acts together with bag 28 in bringing the main body of the dart to the surface of the water after it has been dragged down by the action of the animal following impact.

Obviously many modifications and variations of the present invention are possible in the light of the above teachings. It is therefore to be understood that within the scope of the appended claims the invention may be practiced otherwise than as specifically described.

I claim:

1. A hypodermic dart designed to be thrown or propelled toward a marine animal, the capture of which is desired, the animal when impacted by such dart being capable of traveling a considerable distance through the water before the drug takes effect to immobilize the creature, said dart comprising:

a shaft;

a reel carried on the forward end of said shaft;

a line wound on said reel, one end of said line being secured to said reel;

a hypodermic syringe containing a drug in liquid form detachably carried by said reel, said syringe having a barbed needle on the tip thereof adapted to penetrate the skin of the target animal upon impact, the other end of said line being attached to said syringe;

a flotation member carried on said shaft and rendered buoyant following impact of said dart with a target animal, such impact causing said syringe to detach from said reel and permit the said line to unwind from said reel as said target animal travels through the water away from said shaft;

said flotation member exerting a buoyant effect on said shaft so as to urge the latter toward, or urge it to remain on, the surface of the body of water in which said animal is located, said shaft being oriented in an upright position with respect to such surface; and a radar reflector carried on said shaft above said flotation member.

2. A hypodermic dart according to claim 1, in which said flotation member is rendered buoyant by the admission of gas thereinto.

3. A hypodermic dart according to claim 2 in which said gas is stored under pressure exterior to said flotation member prior to impact of said dart with a target animal.

4. The combination of claim 3 in which said gas is stored under pressure within said shaft.

5. A hypodermic dart according to claim 1, further comprising a second flotation member carried on or near that end of said shaft opposite to said reel, said second flotation member being rendered buoyant essentially simultaneously with said first-mentioned flotation member.

6. The combination of claim 5 in which said second flotation member possesses chromatic characteristics which facilitate the visual detection thereof from a distance.

7. The combination of claim 5 in which said shaft is formed in three detachable sections respectively supporting said two flotation members and said radar reflector.

* * * * *